US007853985B2

(12) United States Patent
Deininger et al.

(10) Patent No.: US 7,853,985 B2
(45) Date of Patent: Dec. 14, 2010

(54) METHOD FOR VERIFYING THE AUTHENTICATION OF A MANAGER APPLICATION IN A TELECOMMUNICATIONS MANAGEMENT NETWORK OPERATING SYSTEM BY MEANS OF A NETWORK ELEMENT AND NETWORK ELEMENT SUITABLE THEREFOR

(75) Inventors: Andreas Deininger, Schonodorf (DE); Egon Haas, Wien (AT); Klaus-Dieter Mueller, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1357 days.

(21) Appl. No.: 11/255,176

(22) Filed: Oct. 21, 2005

(65) Prior Publication Data
US 2006/0101149 A1     May 11, 2006

Related U.S. Application Data

(63) Continuation of application No. 09/936,926, filed as application No. PCT/DE00/00827 on Mar. 17, 2000, now abandoned.

(30) Foreign Application Priority Data
Mar. 19, 1999    (DE)  ................................ 199 12 520

(51) Int. Cl.
    *G06F 7/04*      (2006.01)
(52) U.S. Cl. ........................................................ 726/2
(58) Field of Classification Search ........................ None
See application file for complete search history.

(56) References Cited

U.S. PATENT DOCUMENTS

| 4,317,957 | A |   | 3/1982 | Sendrow |
| 5,696,697 | A |   | 12/1997 | Blau |
| 5,774,551 | A | * | 6/1998 | Wu et al. ............... 713/155 |

OTHER PUBLICATIONS

Microsoft Press Dictionary (Microsoft Press, "Microsoft Press Computer Dictionary", 3rd edition, ISBN: 1-57231-446-X, 1997), p. 210.*
Microsoft Press (Microsoft Press, "Microsoft Window NT Server Networking Guide", ISBN 1572313447, 1996), p. 3-99.*
Surkan (Michael Surkan, "NT on global phone nets", PC Week vol. 14 issue 28, Jun. 1997), only Abstract.*
NTLM (Wikipedia, Feb. 2009).*
HadfieldCH3 (Lee Hadfield, Dave Hater, Dave Bixler, "Windows NT Server 4 Security Handbook", 1997, ISBN: 078971213), p. 63-86.*

(Continued)

*Primary Examiner*—Kambiz Zand
*Assistant Examiner*—Peter Poltorak
(74) *Attorney, Agent, or Firm*—King & Spalding L.L.P.

(57) ABSTRACT

Network elements in telecommunications networks are managed via an operating system which is connected to the network elements. The operating system is formed from a large number of manager applications which communicate with the network elements. In the course of such communication, it is possible to provide for the authentication of a manager application to be checked by means of a network element. According to the invention, this authentication check is carried out centrally in the network element for various communication protocols, with access being made to a central authentication databank 10.

7 Claims, 1 Drawing Sheet

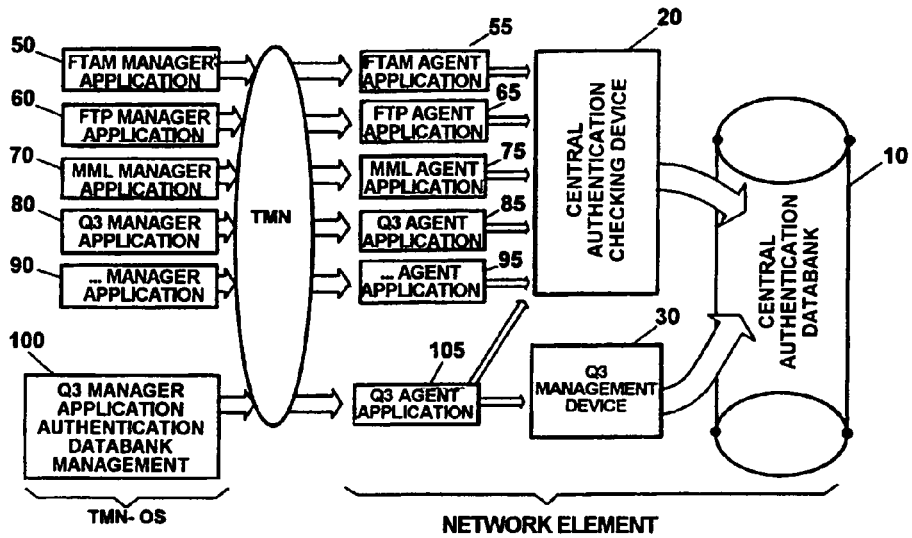

OTHER PUBLICATIONS

Raman (L.G. Raman, Fundamentals of Telecommunications Network Management, ISBN: 0780334663, Mar. 1999).*

TMN (Kirk Shrewsbury, "An Introduction to TMN", Journal of Network and Systems Management, vol. 3 No. 1, 1995).*

M251 (Recommendation M.251 Maintenance Functions to be Implemented in CCITT-MML 1, 1988).*

M251 Cover Sheet with date information.*

Geymonat, M. et al. (1998). "TMN X-Interface Studies and Experiments for ATM," *IEEE* 364-373.

Maillot, D. et al. (1996). "Security and Integrity Requirements Across Inter-domain Management," *In Global Information Infrastructure (GII) Evolution*. S. Rao et al. eds., IOS Press, pp. 478-492.

Microsoft Press. (1996). "Microsoft WindowsNT Server Networking Guide: Technical Information and Tools for the Support Professional," ISBN 1572313447.

Comptech. "Windows NT Domains," located at <http://www.comptechdoc.org/os/windows/ntserverguide/ntsdomains.html> visited on Apr. 5, 2005. (4 pages).

Chadayammuri, P. G. (1996). "A Platform for Building Integrated Telecommunications Network Management Applications," *Hewlett-Packard Journal* Oct.(Article 1):1-10.

"TMN X-Interface Studies and Experiments for ATM", Marina Geymonat, 1998 IEEE, pp. 364-373.

"Security and Integrity Requirements across Inter-domain Management", Dominique Maillot et al., 1996 IEEE, pp. 478-492.

* cited by examiner

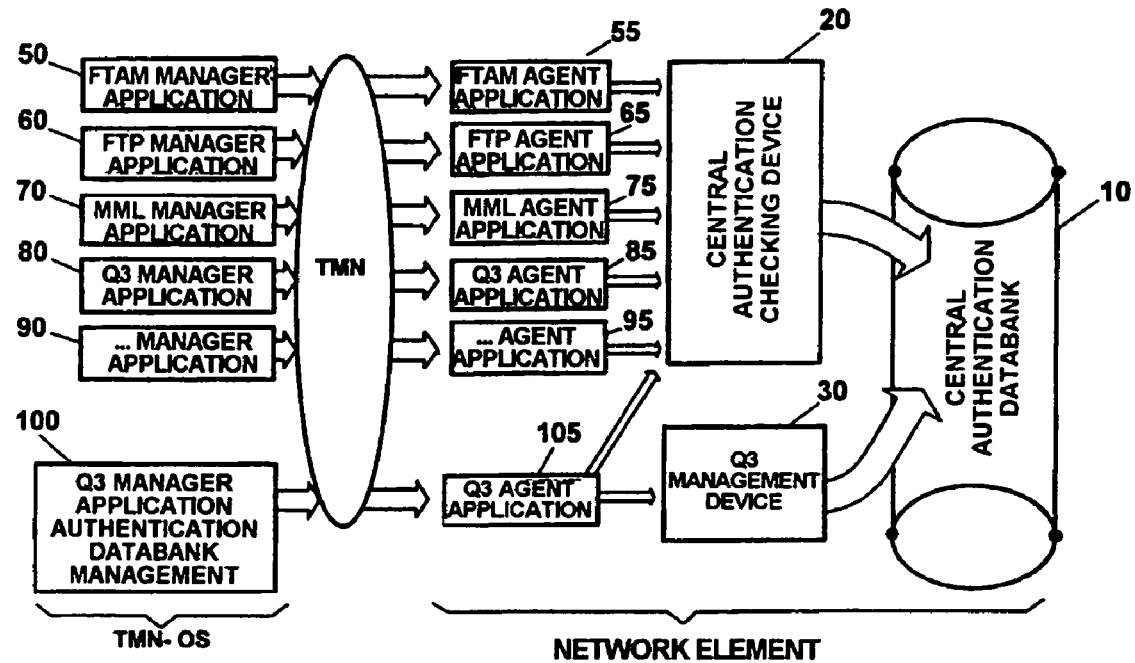

Fig. 1

| COMMUNICATION PROTOCOL | INITIATOR | AUTHENTICATION TYPE |
|---|---|---|
| Q3 | AET | SIMPLE PASSWORD MECHANISM |
| | | RELAY PROTECTED PASSWORD MECHANISM |
| | | IDENTIFICATION ONLY |
| | | CHALLENGE & RESPONSE METHOD |
| FTAM | USER ID | SIMPLE PASSWORD MECHANISM |
| | | RELAY PROTECTED PASSWORD MECHANISM |
| | | CHALLENGE & RESPONSE METHOD |
| FTP | USER ID | SIMPLE PASSWORD MECHANISM |
| | | RELAY PROTECTED PASSWORD MECHANISM |
| | | CHALLENGE & RESPONSE METHOD |
| MML | USER ID | SIMPLE PASSWORD MECHANISM |
| | | RELAY PROTECTED PASSWORD MECHANISM |
| | | CHALLENGE & RESPONSE METHOD |

Fig. 2

METHOD FOR VERIFYING THE AUTHENTICATION OF A MANAGER APPLICATION IN A TELECOMMUNICATIONS MANAGEMENT NETWORK OPERATING SYSTEM BY MEANS OF A NETWORK ELEMENT AND NETWORK ELEMENT SUITABLE THEREFOR

The present invention relates to a method for checking the authenticity of a manager application in a telecommunications management network operating system (TMN-OS) according to the precharacterizing clause of the method claim 1, and to an associated network element according to the precharacterizing clause of the apparatus claim 5.

Switching devices, which are referred to as network elements, are used as nodes in a telecommunications network in order to coordinate the information flow in such networks. The network elements are managed by a specific operating system, the TMN-OS. For this purpose, they are connected together with the operating system to a specific management network, which is referred to as the telecommunications management network (TMN); the network elements are managed by the operating system TMN-OS communicating with the network elements via the TMN.

The TMN-OS is formed from a large number of manager applications, each of which has an associated mating part, which is referred to as an agent application, in each network element.

A manager application in the TMN-OS communicates with its associated agent application in the network element using a fixed defined communication protocol for each manager application/agent application pair. In this case, a distinction is drawn between "public" and "non-public" protocols. Public protocols, which are referred to as open protocols, include, for example, the FTAM, FTP and Q3 protocols. In contrast to this, for example, the MML protocol, which is defined as being proprietary, that is to say manufacture-specific, is non-public.

At the start of or during the handling of a communication protocol, it is possible to provide for the authenticity of a manager application to be checked by a network element. To do this, the manager application which wishes to set up a link to the network element must prove that it is that manager application which it claims to be.

The authentication check is carried out by the manager application transmitting communication-protocol-specific authentication data via the TMN to the network element, in response to which the network element compares the received authentication data with predetermined, stored authentication data.

The authentication check is highly complex since each communication protocol has not only a dedicated authentication check but also individual, protocol-specific authentication data. Various types of initiators and other data are used as authenticity data. The initiators include, for example, human user, user IDs and applications which are identified by an application entity title (AET). Other data are: passwords, keys, replay protected passwords, randoms (random numbers), date and time etc.

In addition to these various protocol-specific authentication data items, a number of checking mechanisms, which are referred to as authentication types, are generally provided for each communication protocol, for carrying out the authentication check as shown in FIG. 2; according to FIG. 2, for the Q3 communication protocol for example, these are a simple password mechanism, a replay protected password mechanism, a pure identification, or a challenge and response method.

This means that, before each authentication check, one of the respectively available authentication types must be selected to carry out that particular authentication check.

Conventionally, there are therefore various software programs, which are referred to as protocol-specific applications, for each communication protocol and in some cases these even have different operator interfaces (MML, Q3) for managing the authentication data and the authentication types.

The object of the method is to provide a method which is simpler than the conventional method for a network element to check the authenticity of a manager application and to provide a network element which is suitable for this purpose, in which method and network element the various protocol-specific applications for managing the authentication data are superfluous.

This object is achieved by the subject matters claimed in patent claims 1 and 5. Further advantageous refinements of the invention are the subject matter of the independent claims.

According to patent claims 1 and 5, the object is achieved in particular in that the authentication check is carried out centrally in an authentication checking device in the network element for various manager applications, that is to say for various communication protocols, and in that the authentication checking device accesses an authentication databank in which the various authentication data for all the communication protocols used are stored centrally.

The method according to the invention and the associated network element offer the advantage that the authentication check can be carried out centrally and in a standard manner for all communication protocols. There is therefore no need to carry out any communication-protocol-specific authentication checks. Furthermore, the central authentication databank results in the management of the various authentication data being considerably simplified, and in the costs being reduced. There is likewise no need for any different applications for management of the communication-protocol-specific authentication data.

Furthermore, the central authenticity checking device and the central authentication databank can be modified or expanded easily when other or additional communication protocols are used.

According to one advantageous refinement of the method, the central authentication databank is managed by a dedicated communication protocol. In this way, the management of the various authentication data for the various communication protocols is standardized by, for example, providing a standard operator interface (MML, Q3) for the management of the various authentication data.

It is advantageous for different communication protocols to be provided for interchanging different information for communication between the manager applications in the TMN-OS and the agent applications in the network element.

In a preferred development of the checking method according to the invention, the step of authentication checking is carried out centrally in the network element not only for each individual communication protocol, but also for different authentication types. This centralization also saves costly communication-protocol-specific individual solutions.

Finally, for the network element designed for carrying out the method, it is advantageous for the central authentication databank to be managed by a management device which is controlled by the TMN-OS via a dedicated agent application within the network element. In addition to saving communication-protocol-specific individual solutions for managing the communication-protocol-specific authentication data, this development furthermore allows decoupling of telecommunication-specific communication and management communication between the TMN-OS and the network element.

The following text contains a detailed description of one preferred exemplary embodiment of the invention, with reference to the attached figures.

FIG. 1 shows a TMN as a connecting network between a TMN-OS and a network element according to the present invention; and FIG. 2 shows a tabular association between communication protocols and respective possible authentication types.

A network element in a communications network is managed by a telecommunications management network operating system (TMN-OS). FIG. 1 shows the coupling of the network element to the TMN-OS via a TMN that is required for this purpose. The TMN-OS has a large number of manager applications 50, 60 ... 100, which are implemented either in hardware, but normally in software. One or more of these manager applications can then run on a computer.

The network element in each case has a corresponding mating part, which is referred to as an agent application 55, 65 ... 105, in the TMN-OS for each manager application. Using these agent applications, the network element communicates via the TMN with the manager applications 50, 60 ... 100 in the TMN-OS. Each manager application communicates with its associated agent application in the form of an individual communication protocol. In this case, the following constellations are possible, according to FIG. 1:

the File Transfer Access Management (FTAM) manager application 50 communicates with the FTAM agent application 55;

the File Transfer Protocol (FTP) manager application 60 communicates with the FTP agent application 65;

the Man Machine Language (MML) manager application 70 communicates with the MML agent application 75; and the Q3 manager applications 80, 100 communicate with the Q3 agent applications 85, 105 in the network element.

A unilateral authentication check is considered, in which the network element checks, before setting up a connection to the TMN-OS, whether the manager application which wishes to set up a connection is that which it claims to be. The authentication check can be carried out not only before but also during the handling of a communication protocol, in which case it is then what is referred to as reauthentication.

In the course of the unilateral authentication check shown in FIG. 1, a manager application 50, 60 ... 100 which wishes to set up a connection to the network element initially sets up the protocol elements required for carrying out the authentication check as a function of its communication protocol, its initiators and a selected authentication type, and sends these to the network element. These protocol elements are then received and evaluated by the network element. During the evaluation process, the authentication data required for carrying out the authentication check is, in particular, filtered out of the protocol elements.

Each of the communication protocols used, for example the FTAM, FTP, MML or Q3 communication protocol, each has its own dedicated authentication data.

Various types of initiators and other data are used as authentication data. The initiators include, for example, human user, user IDs and applications which are identified by an Application Entity Title (AET). Other data are: passwords, keys, relay protected passwords, randoms (random numbers), date or time etc.

The authentication data selected by the agent applications 55, 65 ... 105 are passed on within the network element to a central authentication checking device 20, where they are used for carrying out the actual authentication check.

According to FIG. 2, a number of mechanisms, which are referred to as authentication types, are available for each manager application and for each communication protocol to carry out an authentication check. One of the possible authentication types is selected and predetermined in each specific case for each authentication check.

The authentication check is carried out in such a manner that the central authentication checking device 20 checks whether the authentication type desired by the manager application is valid for that communication protocol and for that initiator, and whether the received protocol-specific authentication data match the original authentication data stored in advance in a central authentication databank 10. If they match, the central authentication checking device confirms that the requesting manager application is authorized to set up a desired connection. The following example relates to this:

With regard to future communications between the TMN-OS and the network element, authentication data for a protocol which is to be used are initially stored in the central authentication databank 10. This is done in such a way that a Q3 manager application requests a Q3 management device 30 within the network element to enter the initiator "HUGO" in the central authentication databank 10, for example for future communication using the FTAM protocol, and such that this must use the "simple password mechanism" authentication type for authentication and such that its identification word is "ABCD1#".

Before each subsequent connection is set up using an FTAM communication protocol, the central authentication checking device 20 in the network element then carries out the authentication check as follows:

From the FTAM agent application 55 in the network element, it receives the information that the FTAM manager application 50 would like to set up a connection, with the manager application outputting "HUGO" as the initiator for the desired connection, and asserting that its identification word is "ABCD1#". The central authentication checking device 20 then compares these data with the original authentication data, already stored in the central authentication databank 10, for the FTAM communication protocol and the "HUGO" initiator and, if they match, allows the connection to be set up.

At the end of an authentication check, the manager application is told by its associated agent application the result of its check together with the consequences resulting from this for the setting up of a connection. The following decisions are possible consequences of the result: the requested setting up of a connection takes place, the requested setting up of a connection is rejected, or the setting up of a connection is terminated after having been started.

The central authentication checking device 20 carries out the authentication check, which is described by way of example for the FTAM communication protocol, in the same way for all the other communication protocols used. In this instance, in each individual case, it accesses the central authentication databank 10, in which the authentication data for all the communication protocols are stored.

As can be seen in FIG. 1, the central authentication databank 10 is managed by a dedicated Q3 manager application 100 in the TMN-OS. In this case, the communication of the Q3 manager application 100 with the network element likewise takes place using the TMN and an associated Q3 agent application 105. In the network element, the Q3 agent application 105 controls the Q3 management device 30, which directly manages the central authentication databank 10.

Typical administration commands which the Q3 management device 30 receives from the Q3 manager application 100 or from its associated Q3 agent application 105 are, for example, the entry, the amendment or the deletion of data in the central authentication databank 10.

In addition to the unilateral authentication check discussed so far, it is in principle also possible to carry out a mutual (or reciprocal) authentication check which, in addition to the described unilateral authentication check, also provides for the checking of the authenticity of a network element and/or of the agent application by a manager application. In this case, the agent application which wishes to set up communication to the operating system or to a manager application in the operating system must verify to the manager application that it is that agent application which it claims to be.

The invention claimed is:

1. A computer-implemented method for checking the authenticity of a manager application in a telecommunications management network operating system (TMN-OS) including multiple manager applications, each manager application connected Co a corresponding one of multiple agent applications of a network element via a telecommunication management network (TMN), each manager application having a predefined communications protocol selected from a plurality of communications protocols and one or more valid authentication mechanisms selected from a plurality of authentication mechanisms, the method comprising:
   transmitting communication protocol-specific authentication data from a first one of the multiple manager applications via the TMN to an agent application of the network element corresponding to the first manager application according to a first communication protocol predefined for the first manager application, the communication protocol-specific authentication data including a requested authentication mechanism; and
   checking the authenticity of the manager application by the network element:
      checking whether the requested authentication mechanism is valid for the first communication protocol predefined for the first manager application; and
      if the requested authentication mechanism is valid, comparing the communication protocol-specific authentication data with predetermined authentication data, wherein
         authentication checking is carried out centrally in an authenticity checking device for any of the plurality of communication protocols and any of the plurality of authentication mechanisms, and
         authentication data and data identifying the one or more valid authentication mechanisms for each of the multiple communication protocols are stored centrally in a central authentication databank.

2. The method as claimed in claim 1, further comprising: managing the central authentication databank by a dedicated communication protocol.

3. The method as claimed in claim 1, wherein the plurality of communication protocols are a Q3, FTAM, FTP or MML protocol.

4. The method as claimed in claim 1, wherein the authentication checking device uses different authentication types.

5. A network element in a telecommunications network, the network element and managed by a telecommunications management network operating system (TMN-OS) via a telecommunications management network (TMN), the TMN-OS including multiple manager applications, each manager application connected to a corresponding one of multiple agent applications of a network element via a telecommunication management network (TMN), each manager application having a predefined communications protocol and one or more valid authentication mechanisms selected from a plurality of authentication mechanisms, the network element comprising:
   multiple agent applications, each configured for receiving communication protocol-specific authentication data via the TMN from an associated one of the multiple manager applications in the TMN-OS, the authentication data including a requested authentication mechanism; and
   an authenticity checking device to receive the communication protocol-specific
   authentication data from each agent application and to check the authenticity of each associated manager application by:
      checking whether the authentication mechanism requested by a particular manager application is valid for the communication protocol predefined for the particular manager application; and
      if the requested authentication mechanism is valid, comparing the communication protocol-specific authentication data received from the particular manager with predetermined authentication data, wherein:
         the authenticity checking device carries out the authentication checking centrally for any of the plurality of communication protocols and any of the plurality of authentication mechanisms,
         the authentication data and data identifying the one or more valid authentication mechanisms for each of the multiple communication protocols are stored centrally in a central authentication databank, and
         at least one of the agent application and the authenticity checking device is at least partially embodied in hardware.

6. The network element as claimed in claim 5, wherein the network element has a management device which manages the central authentication databank.

7. The network element as claimed in claim 6, wherein the management device is coupled to the TMN via a dedicated agent application and is controlled by the TMN-OS.

* * * * *